Sept. 18, 1951 E. N. ARNOLD 2,568,048
CONTRACTIBLE AWNING
Filed April 14, 1949 2 Sheets-Sheet 2

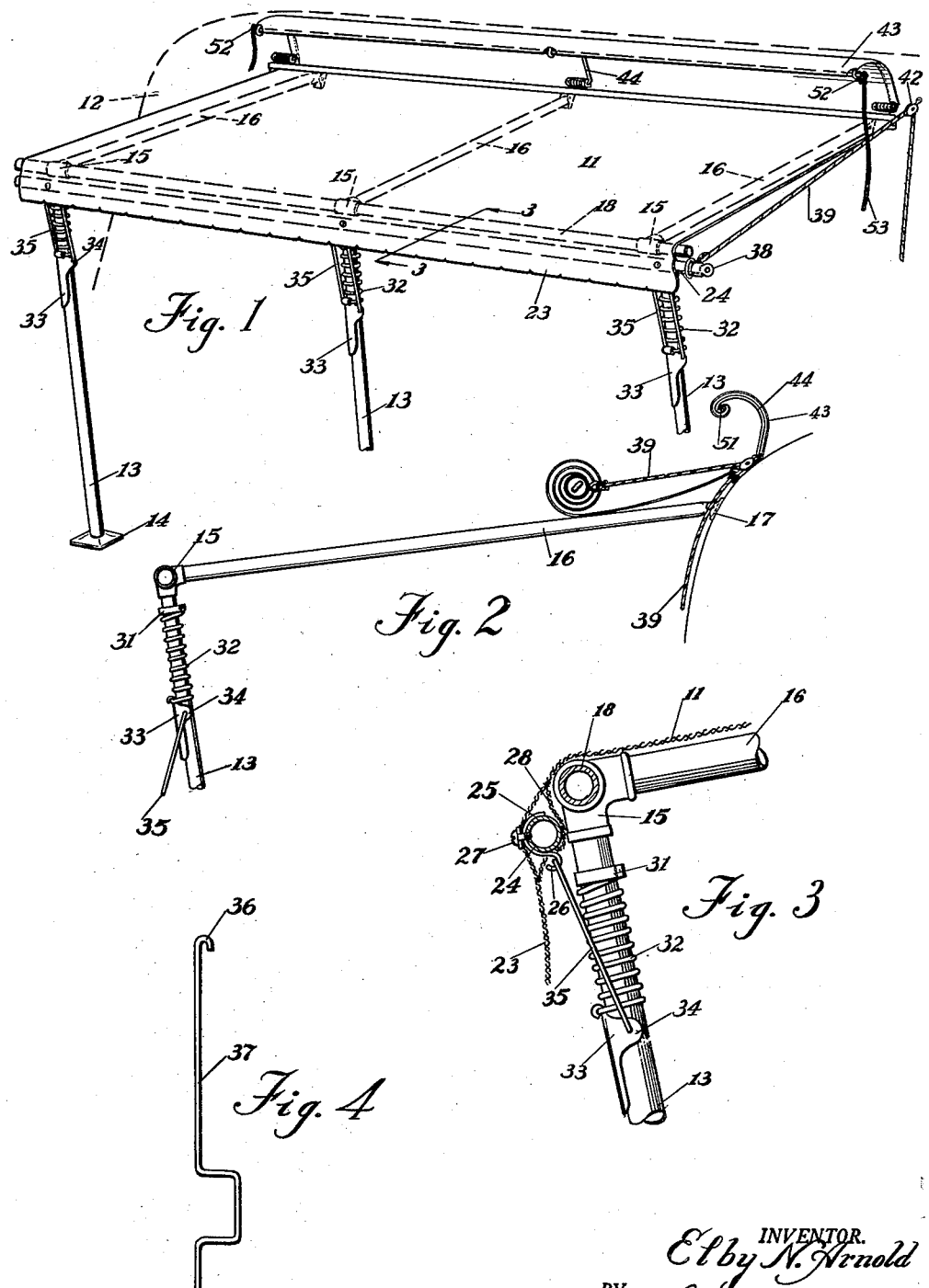

INVENTOR.
Elby N. Arnold
BY
George T. Smyth
ATTORNEY

Patented Sept. 18, 1951

2,568,048

UNITED STATES PATENT OFFICE 2,568,048

CONTRACTIBLE AWNING

Elby N. Arnold, Lawndale, Calif.

Application April 14, 1949, Serial No. 87,544

2 Claims. (Cl. 135—5)

This invention relates to collapsible or contractable awnings, and more particularly, to such an awning which can be quickly and easily changed from a collapsed or contracted position to an extended position.

Although the awning of the present invention is particularly adapted to be used with house trailers, the awning herein shown can be actually used in any installation in which awnings have heretofore been used. For the purpose of illustrating the invention, however, the awning has been shown as an awning for a house trailer.

Most owners of house trailers today find that an awning is a necessity, particularly where the trailer is being used as a stationary residence. The trailer awnings most generally used today consist of a framework of tubular elements which form a support for a sheet of suitable awning material.

Although collapsible or contractable awnings have been in use on buildings and other similar structures for many years, which awnings have generally consisted of an awning-supporting framework pivotally mounted to a vertical wall, such awnings were not acceptable to most trailer owners for a number of reasons, the most important reason being that they usually necessitated the use of fittings which took the entire load of the framework and awning material, and such fittings were found to be difficult to mount to the relatively thin sheet material forming the outer walls of most house trailers. Furthermore, once installed, this load was transmitted to the wall of the trailer, which was not designed to take the loadings thus imposed. In the conventional house trailer awning used today the load is taken by the framework, which is supported as before explained by the vertical members extending upwardly from the ground adjacent the trailer.

The awning of the present invention does not impose any loads on the trailer body not imposed by conventional trailer awnings used today, for the awning of the present invention utilizes the same framework, which can be used without change. In fact, many conventional awnings used on trailers today can be very quickly converted into an awning embodying the present invention.

As in present day trailer awnings, the material is extended over the horizontal members of the framework to form a canopy extending outwardly of the trailer at the one side thereof. To hold the awning material against movement in its extended position, resilient clamping means are provided on the vertically extending members of the framework adjacent the upper ends thereof. These clamp elements are detachably engaged with cooperating elements carried by the under surface of the awning material adjacent the outer edge thereof, and when moved to a closed position resiliently hold the awning material taut in its extended position.

The outer edge of the awning material is formed with a longitudinally extending pocket for receiving a rigid, elongate member extending the length of the outer longitudinal edge of the awning material. This member forms a roller element upon which the awning material can be wound as the member is rolled up the horizontal members extending outwardly from the trailer body. Although any means can be used to revolve this roller element, in the now preferred embodiment of the invention the rolling action is accomplished through a detachable crank formed at its one end with a hook element receivable in an eye member provided at the one end of the elongate roller member.

When it is desired to contract the awning it is merely necessary to disengage the resilient clamps and through the use of the crank cause the roller element to roll up the horizontal members of the framework, causing the awning material to wind itself upon the roller element as the same moves toward the trailer body. Once the awning material is completely wound upon the roller element and is lying adjacent the trailer body, the roller element can be held against accidental movement by any means desired to thus hold the awning contracted.

To protect the rolled up awning against the elements, means are herein provided which form a cover for the contracted awning. The cover means can be moved to a position in which the contracted awning is completely covered and thus the same not only protects the contracted awning from the elements but also forms an enclosure member which hides the contracted awning and thus improves the appearance of the trailer when the awning is contracted.

Other features and advantages of the present invention will be apparent from the following detailed description of the awning when taken with the accompanying drawing, in which:

Figure 1 is a perspective view showing the awning of the present invention with the awning sheet thereof in its fully extended position;

Figure 2 is an end elevational view of the awning of the present invention showing the awning sheet in a partially contracted position;

Figure 3 is a section taken along line 3—3 of Figure 1;

Figure 4 is a view of the crank arm used to contract and extend the awning sheet;

Figure 5:
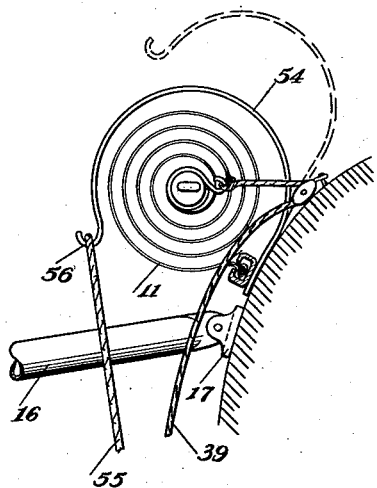
Figure 5 is an end elevational view of one form of the housing for enclosing the contracted awning sheet.

The awning of the present invention, referring now to the drawing, and more particularly to Figure 1 thereof, comprises a frame for supporting a flexible sheet of awning material 11 in such a way that the awning sheet extends outwardly in the form of a canopy from the structure to be shaded, such as the trailer indicated at 12. The frame comprises a plurality of substantially vertical extending members 13 disposed laterally at the one side of the trailer 12, each formed at the lower end with a ground-engaging pedal member 14. The upper ends of the vertical members 13 carry suitable connectors 15 for receiving the outer ends of substantially horizontal members 16, the opposite or inner ends of which are fixed to the trailer by means of brackets 17.

A plurality of relatively short lengths of tubular members are interconnected through the connectors 15 to form an elongate, substantially horizontal tubular member 18. The opposite ends of this member are preferably capped by some suitable cap or plug element. Although the horizontal members 16 are connected at their inner ends to the trailer 12, the weight of the frame is taken substantially by the vertically extending members 13 so that little, if any, load is imposed on the trailer by the awning of the present invention.

The inner longitudinal edge of the awning sheet 11 is fixed to the trailer body 12 and in the now preferred embodiment of the invention this inner edge is fixed to the trailer body by turning the edge back upon itself and then stitching the turned back edge to provide an elongate pocket extending across the edge in which is mounted a rope or cable 19. This construction, as should be obvious, forms a bead extending across the inner longitudinal edge of the awning which can be mounted within a rail 21.

Figure 9:
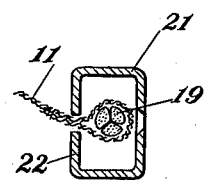
Figure 9 is a sectional view of the rail used to secure the inner longitudinal edge of the awning sheet to the trailer.

The rail 21 is channel shaped in cross section, as best seen in Figure 9, and is secured to the upper portion of the wall of the trailer body by conventional fastening elements such as screws or the like. The legs of the channel are formed with in-turned flanges 22 defining a relatively narrow slot, the width of which is less than the diameter of the bead formed by the rope or cable 19 mounted in the pocket formed by the folded back edge of the sheet. The rail is of a length at least as great as the width of the awning sheet 11, which is preferably mounted to the rail by introducing the beaded edge thereof into either end of the rail and then sliding the entire awning sheet along the rail until the former is in the desired position relative to the trailer.

The body of the awning sheet 11 is then disposed over the frame formed by the members 13, 16 and 18 so as to extend outwardly from the trailer to form a canopy therefor. The awning sheet 11 is somewhat longer than the members 16 of the frame, so that the sheet extends over and downwardly of the member 18 of the frame to form a valance 23, the lower edge of which may be scalloped or given some other configuration to increase the appearance of the awning.

The awning so far described is substantially like the conventional trailer awnings used today. In the conventional trailer awnings the awning sheet is permanently secured to either the load carrying vertical members 13 or to the horizontal interconnecting member 18. Such an awning cannot be contracted, and if the occasion demands, as during stormy weather when there is danger of the awning being torn from the framework by winds or heavy downpours of rain it was necessary to disconnect the outer longitudinal edge portion of the awning sheet from its supporting frame and then longitudinally slide the awning sheet to disengage it from the inner edge-securing rail, after which the awning could be folded for storage in some storage compartment. As there is no way of contracting these awnings, trailers today are considerably darkened on dull days by the same, for it is obvious that the canopy formed by the awning would restrict the amount of light entering through the windows of the trailer on the side to which the awning was attached.

The difficulties had with prior trailer awnings are obviated by the present invention, for the awning of the present invention can be easily and quickly contracted whenever it is desired to do so. In the awning of the present invention, an elongate rod or tubular element 24 is permanently attached to the upper edge of the valance member 23. Although this member may be attached to the upper edge of the valance by any means desired, in the illustrated embodiment of the invention the element is secured to the underneath side of the valance 23 by means of a plurality of substantially S-shaped clamps 25 spaced apart along the upper longitudinal edge of the valance 23.

It will be seen, referring now to Figure 3 of the drawing, that the one curved section of each clamp is mounted around and over the tubular member 24 with the other curved section extending downwardly and facing outwardly of the awning to form a depending hook-like member 26. The curved section of each clamp mounted over the tubular member 24 is fixed thereto by some conventional securing means such as the bolt 27 shown. It is now preferred to form spaced, tapped openings in the wall of the tubular member 24 into which the bolts 27 are threaded. The bolts 27 are also used to fix the tubular member to the upper edge of the valance 23, for the bolts are passed through preformed openings formed in the valance 23. A small washer such as shown in Figure 3 is preferably used between the valance 23 and the head of the bolt 27 to protect the material of the valance.

A strip 28, preferably of the same material used to form the main body of the awning, is attached, as by sewing, along the inner surface of the valance 23 to form an elongate pocket housing the tubular member 24. This strip is formed with small, spaced buttonhole-like openings through which the hook elements 26 extend. It will be now seen that the tubular member 24 is fixed within the pocket formed along the upper edge of the valance member 23.

Although the weight of the tubular member 24 will tend to hold the awning 11 in its fully extended position, it is now preferred to provide positive holding means which may be carried adjacent the upper ends of the vertically extending members 13 of the frame and which when engaged with the hook elements 26 of the clamps 25 will tightly hold the awning in its fully extended position. To this end, the clamps 25 are so mounted to the tubular member 24 as to be properly positioned thereon with respect to the spaced vertical members 13.

Although any means desired may be fixed to the vertical members 13 to cooperate with the hook elements 26 to positively hold the awning in its fully extended position, in the now preferred embodiment of the invention these means each comprise a collar 31 rigidly fixed about the upper end of each vertically extending member 13. A coiled spring 32 sleeving each tubular member 13 is fixed at its upper end to the collar 31 carried by the member 13. Each spring 32 pivotally carries at its lower end an operating member or handle 33 which is formed with a pair of laterally extending arms 34 disposed on opposite sides of the vertically extending member 13.

A bail member 35 straddles the upper end of each member 13 and the free ends of the legs thereof are pivotally anchored to the laterally extending arms 34 of the handle 33. The bow of each bail member 35 is adapted to be engaged by the hook elements 26 of the clamps 25, and this can be easily accomplished by swinging the handles 33 outwardly of the vertical members 13 a distance sufficient to arcuately move the pivotal connection between the bail member and the arms 34 to permit the bow of the bail to drop over the hook elements 26. After the bow of each bail member 35 is engaged with its hook element 26 the handle member 33 is moved downwardly to a position in which the handle member 33 engages the vertically extending member 13. It will be seen that as the pivotal connection between the legs of the bail member 35 to the arms 34 moves inwardly of the pivotal connection between the handle 33 and the spring 32, each bail member 35 will snap inwardly because of the toggle arrangement formed by the bail member 35 and the handle 33. As the lower ends of the springs 32 are not fixed to the vertically extending members 13, these springs will be compressed when the handle members 33 are moved downwardly against the members 13 and will resiliently hold the awning 11 taut across the upper urface of the frame.

To contract the awning of the present invention, it is merely necessary to disengage the bail members 35 from the hook element 26, which, as should now be understood, can be easily done by moving the handles 33 upwardly about the pivotal connection between the same and the springs 32. After the bail members 35 have been disengaged from the hook elements 26, the tubular member 24 can be rotated to cause the awning to wind up thereon by engaging a hook 36, carried at the end of a long crank arm 37, with an eye 38 formed at the one end of the tubular member 24. The tubular member 24 can be very easily caused to roll up the frame members 16 by rotation of the crank arm 37 and thus wind the awning 11 about the roller element formed by the tubular member 24.

As the awning winds upon the roller element, the shortening awning carries the same and the portion of the awning wound thereon over the horizontal frame members 16 to a position in which the contracted awning is held as a compact roll contiguous to the rail 21.

To hold the roll of awning material in its compact or contracted position, a rope or cable 39 has one end thereof fixed to an eye of a ring 41 loosely carried by tubular member 24 adjacent the one end thereof. The opposite end of the rope 39 is passed over a pulley 42 fixed to the side wall of the trailer and then passed downwardly so that the same may be easily grasped by the owner of the trailer. The free end of the rope 39 can be then fastened to some bracket or the like carried by the trailer to hold the awning in its contracted position.

Figure 8:
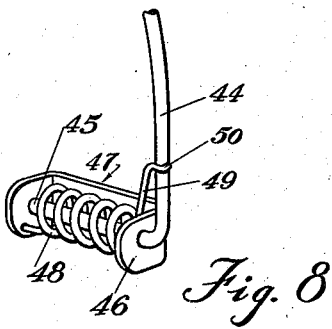
Figure 8 is a fragmentary perspective view of one of the arms for supporting the flexible sheet forming the housing shown in Figure 6.

As it may be necessary, because of the weather, to maintain the awning contracted for long periods of time, it is now preferred to provide a housing for enclosing and protecting the contracted awning. This housing, in the one form of the invention, comprises an elongate strip 43 of material, preferably the same as that used to form the awning 11, carried by a plurality of curved arms 44 pivotally mounted at spaced points along the trailer 12 as best seen in Figure 1. Each arm 44 is formed with a laterally extending finger 45, referring now to Figure 8, which is mounted in aligned openings formed in spaced ears 46 of a bracket 47. The brackets 47 are fixed at spaced points to the trailer 12 just above the rail 21 so that the arms 44 normally extend outwardly therefrom.

Each finger 45 is sleeved by a coil spring 48, the one end of which is fixed to one of the ears 46, and the opposite end thereof is provided with an extension 49 formed at its free end with a claw element 50 grasping the inner end of the curved arm 44. The coiled springs 58 normally hold the arms 44 in the position shown in Figure 2 to permit the contracted awning to be moved to a position contiguous to the trailer.

Figure 6:
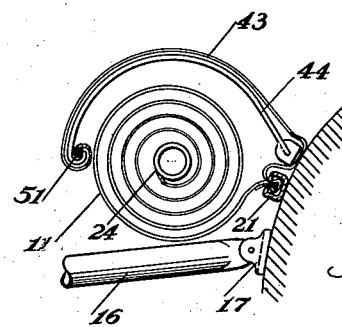
Figure 6 is a view similar to Figure 5 but showing a modified form of the housing.
Figure 7:
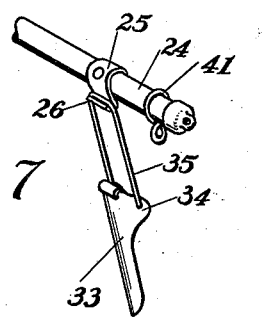
Figure 7 is a fragmentary perspective view of one end of the roller member and showing a part of the means used to hold the awning sheet in its fully extended position.

To move the arms 44 downwardly to the position shown in Figure 6, the outer ends of the arms 44 are each formed with a turned back portion forming an eye for receiving an elongate rigid rod 51 fixed in a pocket formed at the outer longitudinal edge of the strip 43. One or both ends of the rod 51 may carry a fitting 52, to which can be secured a rope or cable 53 extending downwardly to a position in which it can be grasped by the owner of the trailer to pull the curved arms 44 and the material 43 carried thereby downwardly to the position shown in Figure 6 in which the arms and the strip 43 supported thereby form a housing for enclosing and protecting the contracted awning 11. When it is desired to again extend the awning it is merely necessary to release the rope 53, whereupon the springs 48 move the arms 44 upwardly to the position shown in Figure 2, after which the contracted awning may be extended in the same manner as the awning was contracted.

There is shown in Figure 5 a modified form of the housing for enclosing and protecting the contracted awning. This housing in this form of the invention comprises an elongate strip 54 of some resilient material formed into a configuration somewhat J-shaped in cross section. The one longitudinal edge of the strip 54 is secured to the trailer 12 by the same means used to secure the rail 21, as clearly seen in Figure 5. The resiliency of the material from which the strip 54 is formed normally tends to hold the strip in the position shown in broken lines in Figure 5 but yet will permit the same to be moved to the position shown in full lines in the figure referred to, in which position the strip 54 encloses the contracted awning.

Although any means desired can be used to move the strip 54 to its enclosing position, it is now preferred to move the strip by means of a rope or cable 55 secured at one or both ends of the strip 54. The rope or cable 55 can be secured to the strip 54 by forming one or both edges of the same with a small fitting 56 which may, if desired, be formed integral with the strip 54.

It will be seen now that in both embodiments of the housing shown, the same is normally held in a position in which the contracted awning may move into a position contiguous to the trailer but yet which can be moved downwardly to an enclosing position to preserve and protect the contracted awning.

Although the now preferred embodiments of the present invention have been shown and described herein, it is to be understood that the same is not to be limited thereto, for it is susceptible to changes in form and detail within the scope of the appended claims.

I claim:

1. A contractable awning, comprising: a supporting frame extending outwardly from the structure to be shaded by said awning and including ground engaging means for supporting said frame; a flexible sheet of awning material; means for permanently connecting the inner longitudinal edge of said sheet to said structure, said sheet extending outwardly from said structure and overlying said supporting frame to be supported thereby; hook-like means spacedly carried by said sheet adjacent the outer longitudinal edge thereof; catch means carried by the outer portion of said frame for releasably engaging said hook-like means; resilient means tending to retract said catch means whereby said sheet is resiliently held in a fully extended position relative to said structure; and an elongate, rigid means carried by said sheet adjacent the outer longitudinal edge thereof, upon which said sheet may be wound by rotation of said elongate means after release of said catch means; the winding of said sheet material about said rotating elongate means shortening the sheet and drawing said elongate means and the portion of the sheet wound thereon toward and into a contracted position adjacent the inner edge of said sheet.

2. An awning of the type described, comprising: a supporting frame, including vertical members spaced laterally from a structure and horizontal members interconnecting the upper ends of said vertical members and said structure; a flexible awning of sheet form; means for securing the inner longitudinal edge of said awning to the supporting structure; an elongate member of a length substantially equal to the length of said awning; means for permanently connecting the elongate member to said awning adjacent the outer longitudinal edge thereof; connector means spacedly carried by said awning adjacent the outer longitudinal edge thereof; connector means carried by said vertical members adjacent the upper ends thereof; and resilient means normally urging said last named connector means downwardly of said vertical members, said last named connector means being releasably engageable with said first named connector means for resiliently holding said awning in a fully extended position overlying the horizontal members of said frame; said awning, upon disengagement of said connector means, being adapted to be wound upon said elongate member as the same is revolved, the awning as it is wound upon said elongate member carrying the latter member and the portion of the awning wound thereon over said horizontal members to a position in which the elongate member and the awning wound thereon is adjacent said supporting structure.

ELBY N. ARNOLD.

REFERENCES CITED

The following references are of record in the file of this patent:

UNITED STATES PATENTS

| Number | Name | Date |
| --- | --- | --- |
| 481,954 | Jewel | Sept. 6, 1892 |
| 758,016 | Mudd | Apr. 19, 1904 |
| 1,288,825 | Buttolph | Dec. 24, 1918 |
| 1,915,492 | Hennicke | June 27, 1933 |
| 2,107,608 | Hewlett | Feb. 8, 1938 |
| 2,423,402 | Olsen | July 1, 1947 |